US010598262B2

(12) United States Patent
Pawloski

(10) Patent No.: US 10,598,262 B2
(45) Date of Patent: Mar. 24, 2020

(54) GEARLESS SPEED REDUCER OR INCREASER

(71) Applicant: Marmalade Technologies LLC, North Babylon, NY (US)

(72) Inventor: John Pawloski, West Islip, NY (US)

(73) Assignee: MARMALADE TECHNOLOGIES LLC, North Babylon, NY (US)

( * ) Notice: Subject to any disclaimer, the term of this patent is extended or adjusted under 35 U.S.C. 154(b) by 25 days.

(21) Appl. No.: 16/029,901

(22) Filed: Jul. 9, 2018

(65) Prior Publication Data

US 2018/0313435 A1    Nov. 1, 2018

Related U.S. Application Data

(63) Continuation of application No. 15/024,079, filed as application No. PCT/US2014/064934 on Nov. 11, 2014, now Pat. No. 10,018,255.

(60) Provisional application No. 61/906,569, filed on Nov. 20, 2013.

(51) Int. Cl.
F16H 13/08    (2006.01)
(52) U.S. Cl.
CPC .................................. *F16H 13/08* (2013.01)
(58) Field of Classification Search
CPC ........................................................ F16H 13/08
See application file for complete search history.

(56) References Cited

U.S. PATENT DOCUMENTS

| 8,033,953 B2 | 10/2011 | Pawloski |
| 10,018,255 B2 * | 7/2018 | Pawloski ............... F16H 13/08 |

FOREIGN PATENT DOCUMENTS

| JP | S4719809 B | 6/1972 |
| JP | 6053266 B2 | 3/1985 |

OTHER PUBLICATIONS

Japanese Office Action corresponding to Japanese Appln. No. JP 2016-533623 dated Sep. 18, 2018 (3 pages), and English translation (4 pages).

* cited by examiner

*Primary Examiner* — Derek D Knight
(74) *Attorney, Agent, or Firm* — George Likourezos, Esq.; Carter, DeLuca & Farrell LLP

(57) ABSTRACT

A gearless speed reducer or increaser consists of an input shaft, an output shaft, and a motor connected to the input shaft. There is an external race connected to one of the shafts, and an internal race attached to the other shaft. Two ball bearings are disposed between the races and held in place by a finger assist. After the ball bearings have been inserted, the shafts are tilted relative to each other so that the balls become fixed in pockets created between the races and cannot slide within the races.

18 Claims, 9 Drawing Sheets

GEARLESS SPEED REDUCER OR INCREASER

CROSS-REFERENCE TO RELATED APPLICATIONS

This application is a continuation of, and claims the benefit of, and priority to, U.S. Utility application Ser. No. 15/024,079, filed on Mar. 23, 2016, now U.S. Pat. No. 10,018,255, which is a national stage entry of International Application PCT/US2014/064934, filed on Nov. 11, 2014, which claims priority under 35 USC 119(e) of U.S. Provisional Application Ser. No. 61/906,569, filed on Nov. 20, 2013, the disclosure of each of which is herein incorporated by reference.

BACKGROUND OF THE INVENTION

1. Field of the Invention

This invention relates to a gearless speed reducer or increaser. In particular, this invention relates to a device that transmits rotational power from an input shaft to an output shaft, so that the second shaft rotates at a greater or lesser speed than the input shaft, using a set of ball bearings, and without using gears.

2. The Prior Art

In traditional devices used to increase or reduce speed, the connection between the input shaft and the output shaft is made through the use of gears. An internal gear on one shaft cooperates with an external gear on the other shaft to transmit the power from one shaft to the other. If the two shafts have different radii, the speed of one shaft will differ from that of the other shaft.

A problem with this arrangement however, is that it is very difficult to create precisely machined gears that have no play between them. This play leads to inaccuracies in the machine in which the shafts are disposed. With operations that require very precise positioning, such as with jewelry making or circuit board operations, the traditional gear-based speed reducers are not optimal.

U.S. Pat. No. 8,033,953, the disclosure of which is herein incorporated by reference, provides a gearless speed reducer or increaser which solves these problems. However, it would be desirable to provide a device of this type which does not require precise manufacturing tolerances.

SUMMARY OF THE INVENTION

It is therefore an object of the invention to provide a speed reducer or increaser that can achieve very precise tolerances. It is another object of the invention to provide a speed reducer or increaser that can be easily manufactured with few parts.

These and other objects are achieved by a gearless speed reducer or increaser comprising an input shaft, an output shaft, and a motor connected to the input shaft. There is an external race connected to one of the shafts, and an internal race attached to the other shaft. Two ball bearings are loosely disposed between the races. After the ball bearings have been inserted, the shafts are tilted relative to each other to form a pocket for the balls so that the balls are held in place, and cannot slide around within the races. The pocket is formed by the tilting of the races, and the curvature of the inner and outer races with respect to each other. The pockets are created by reducing the clearance on either side of the ball via the tilting so that the ball cannot move out of its current position. Rotating one of the shafts thus rotates the other shaft, since the balls do not slip when they are confined within the pocket between the races. Instead, the rotation of the input shaft causes the ball bearings to rotate, which in turn rotate the output shaft in the opposite direction. The ratio of the diameter of the inner race to the outer race is what determines the degree of speed reduction or increase. The greater the size difference between the inner and outer race, the greater the speed reduction (or increase). If the outer race has an inner (contact) diameter of twice the outer (contact) diameter of the inner race, then the speed ratio of the inner race to the outer race will be 2:1.

The system can be uncoupled merely by pivoting the shafts back into alignment so that the balls can rotate freely within the races.

The amount of tilt required to engage the shafts with each other depends on the amount of play existing between the races and the balls. The shafts are tilted just enough to capture the balls so that they stay in place. The tilt occurs around an axis running through both of the balls, and through a center of the races. This axis is perpendicular to the longitudinal axis of the shafts.

The inner race can be mounted on either the input shaft or the output shaft, depending on whether the system is used as a speed increaser or reducer. For speed reduction, the inner race is mounted on the input shaft. For speed increase, the outer race is mounted on the input shaft. Once the proper tilt angle is created, the shafts can be fixed in place to guarantee smooth power transmission. Speed reduction takes place because one rotation of the input shaft causes only a fractional rotation of the output shaft, due to the larger diameter of the outer race.

A system can be set up using two of the transmission arrangements, arranged on either end of an intermediate shaft. The input shaft transmits power through the first transmission arrangement, which causes the output shaft to rotate. This output shaft forms part of an intermediate shaft and is connected to a second transmission arrangement, which then transmits power to the final output shaft of the second transmission arrangement. By using two transmission arrangements, a maximum amount of speed reduction can be achieved, and the angles of the two transmission arrangements can be set so that the input shaft and the final output shaft are rotating parallel to each other. The intermediate shaft can be constructed as a hollow sleeve into which the output shaft of the first speed reducer is inserted. The input shaft of the second transmission arrangement is inserted into the other end of the sleeve.

The shafts are held in place in the sleeve against rotation. This can be accomplished in several ways. In one embodiment, the shafts and sleeve are equipped with a series of ball tracks, into which ball bearings are disposed. The ball bearings hold the shaft against rotation in the sleeve. In another embodiment, a keyway is provided. The sleeve can be provided with a longitudinal ridge that slides within a longitudinal groove in the shaft, or vice versa. This also prevents rotation of the shaft within the sleeve. While rotation relative to the sleeve is prevented, the shafts are able to move longitudinally within the sleeve to obtain the proper tension on the speed reducers. This tension is accomplished by springs, which press the shafts and their associated races against the corresponding races in the speed reducers. This ensures that the rotational motion is transmitted through the transmission arrangement, and prevents any slippage by the balls in the transmission arrangement. The sleeve is also preferably equipped with stop elements that prevent excessive axial movement of the shafts within the sleeve.

In another embodiment, the shafts are supported in a housing, and finger assists are mounted in the housing so as to press the balls into place within the races. The finger assists are rigid projections that extend into the races and press the balls into the proper position. This allows the unit to function well, even if precise manufacturing tolerances are not achieved. The finger assists can have a curved surface that contacts the balls, which gives greater contact with the balls, and/or can have a rubberized coating or pad on the contact surface, which also increases friction with the balls to prevent excessive movement. One finger assist can be provided for each ball. The finger assists can be fixedly connected to the housing, or can be mounted so as to pivot. The pivoting mount allows the finger assists to achieve the greatest amount of contact with the balls.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
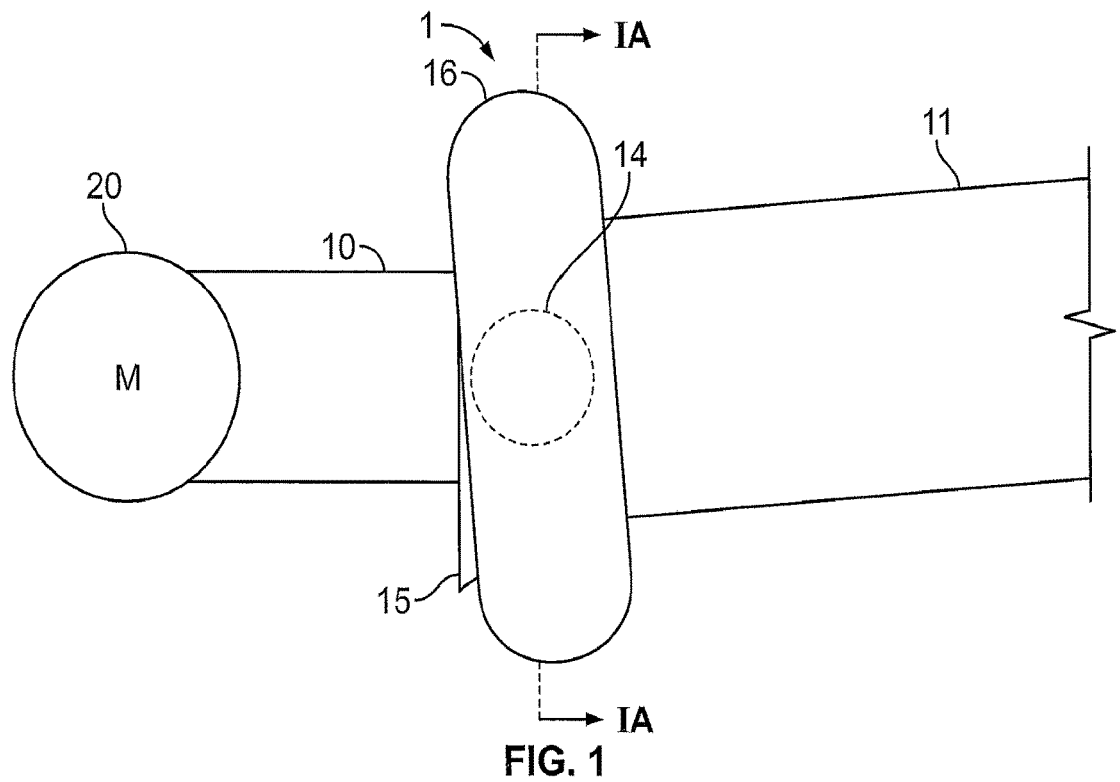
FIG. 1 shows a top view of the transmission arrangement according to the invention, with the ball bearing shown in dotted lines.

Referring now in detail to the drawings, FIG. 1 shows a top view of the transmission arrangement according to one embodiment of the invention. The transmission arrangement 1 comprises an input shaft 10, connected to an inner race 15, and an output shaft 11, connected to an outer race 16. Between the two races are two ball bearings 14, shown in dotted lines in this view. A motor 20 is connected to input shaft 10. Inner race 15 is disposed angularly offset to outer race 16, so that ball bearings 14 are held in a pocket between the races with no play. The offset occurs by pivoting one of the races around the y-axis shown in FIGS. 2-3. The degree of offset required to hold the balls depends on the curvature of the raceways, the size of the balls, and the amount of play of the balls in the races prior to being offset. This pivoting creates a pocket to accommodate the balls, and reduces the clearance on both sides of each ball 14 to eliminate the ability for the ball to slide along the races. Balls 14 are held in the races 180 degrees apart at all times, and the pivot or offset of the races takes place around an axis created by balls 14. Rotation of input shaft 10 causes output shaft 11 to rotate, but at a different speed. The speed reduction or increase is directly dependent on the ratio between the diameters of the inner and outer races.

Figure 2A:
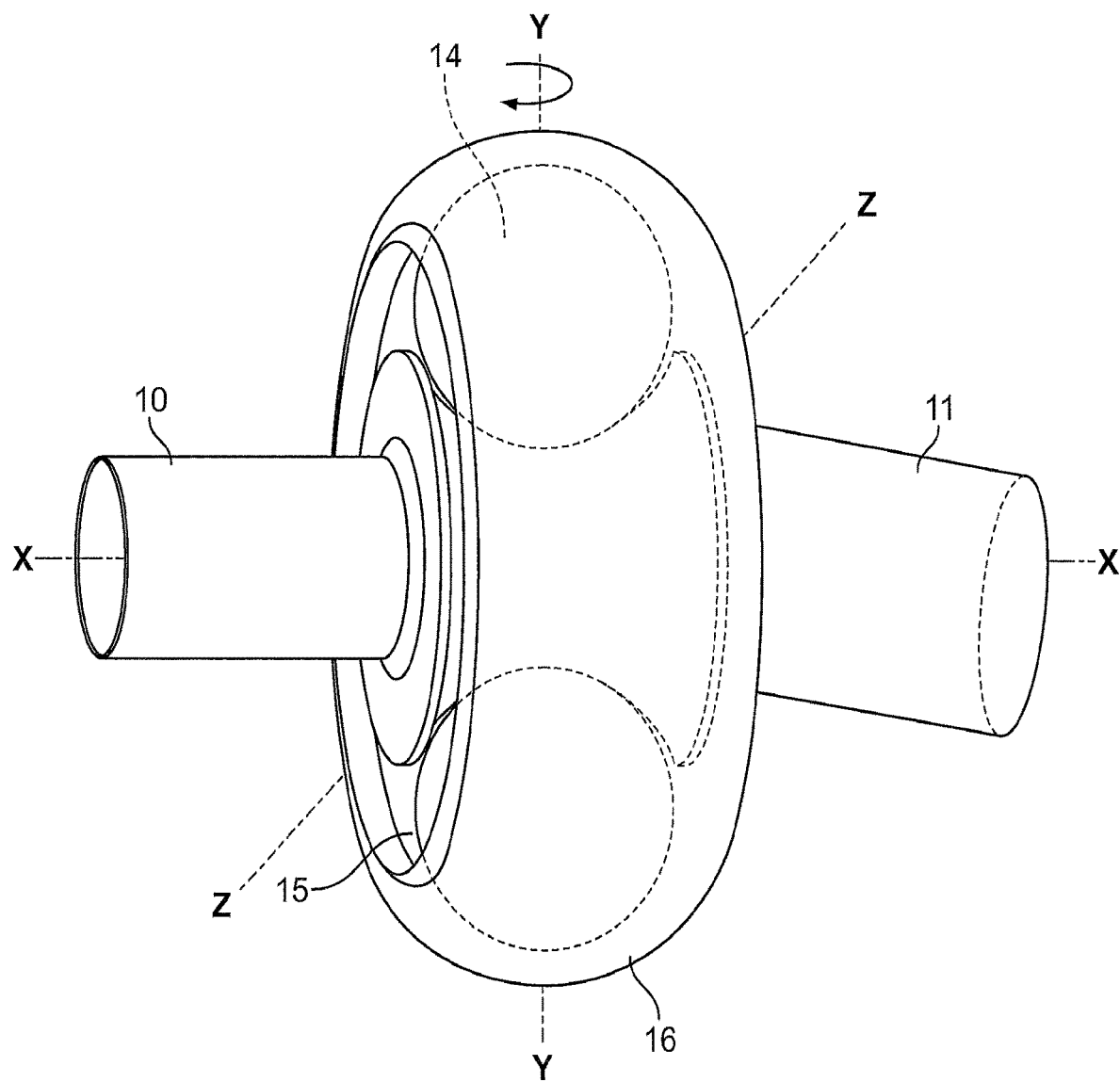
FIG. 2A shows a perspective view of the arrangement shown in FIG. 2.
Figure 2:
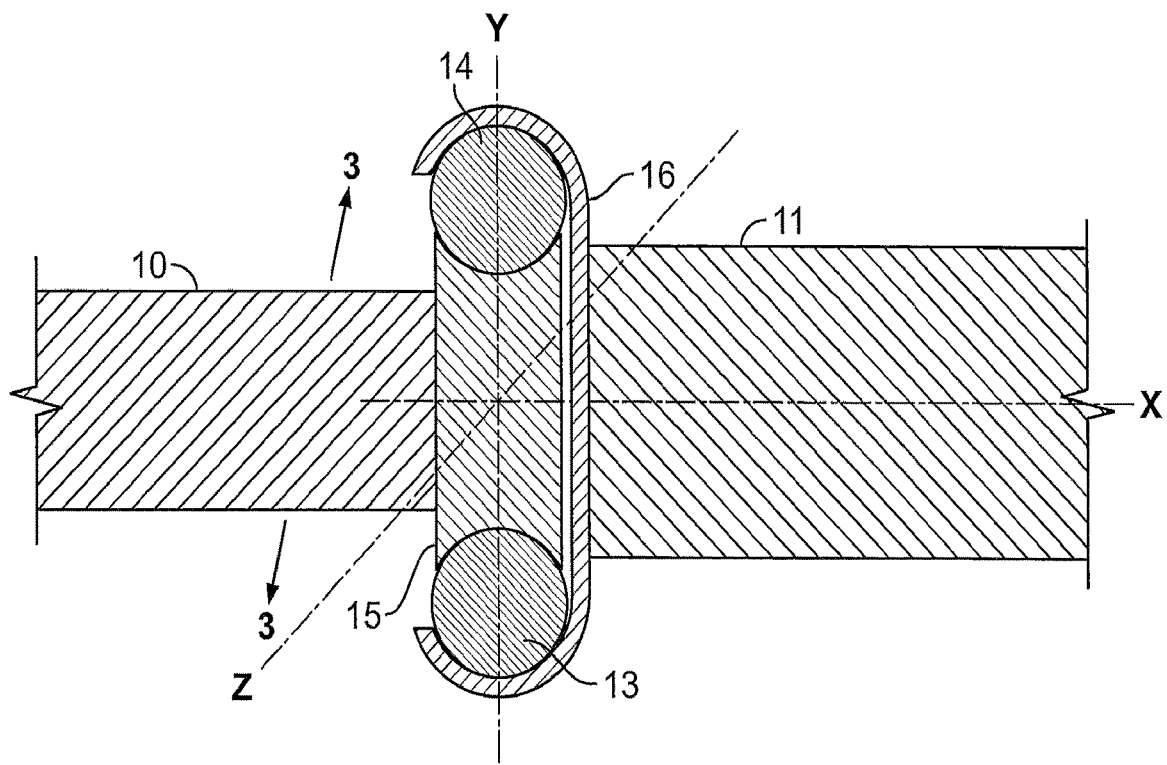
FIG. 2 shows a side cross-sectional view of the transmission arrangement of FIG. 1.
Figure 3:
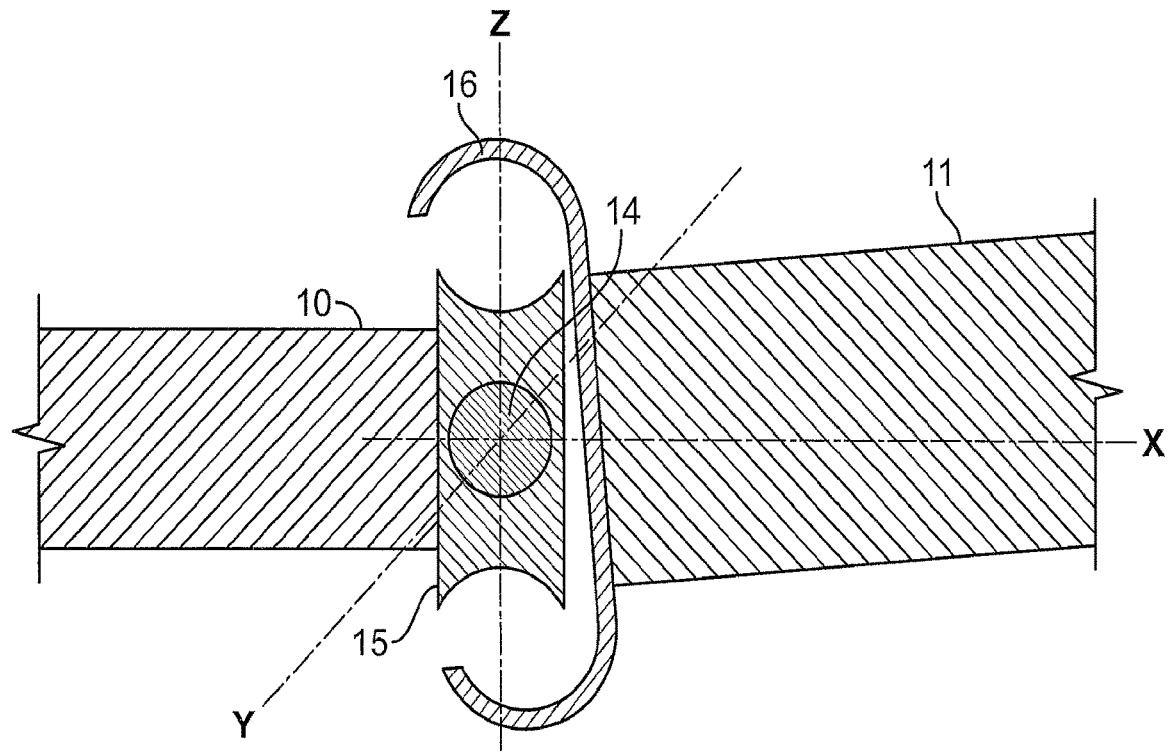
FIG. 3 shows a top cross-sectional view of the transmission arrangement of FIG. 1.

FIG. 2 shows a side cross-sectional view of transmission arrangement 1 according to the invention, and FIG. 3 shows a top cross-sectional view, which is the same view shown in FIG. 1. FIG. 2A shows a perspective view of the transmission element 1. Here, it is clearly shown that outer race 16 is pivoted with respect to inner race 15. This pivoting takes place around the Y axis, to form pockets for balls 14. The twisting of the races cuts off access to the rest of the ball cage, to prevent the balls 14 from sliding around within the races.

Figure 1A:
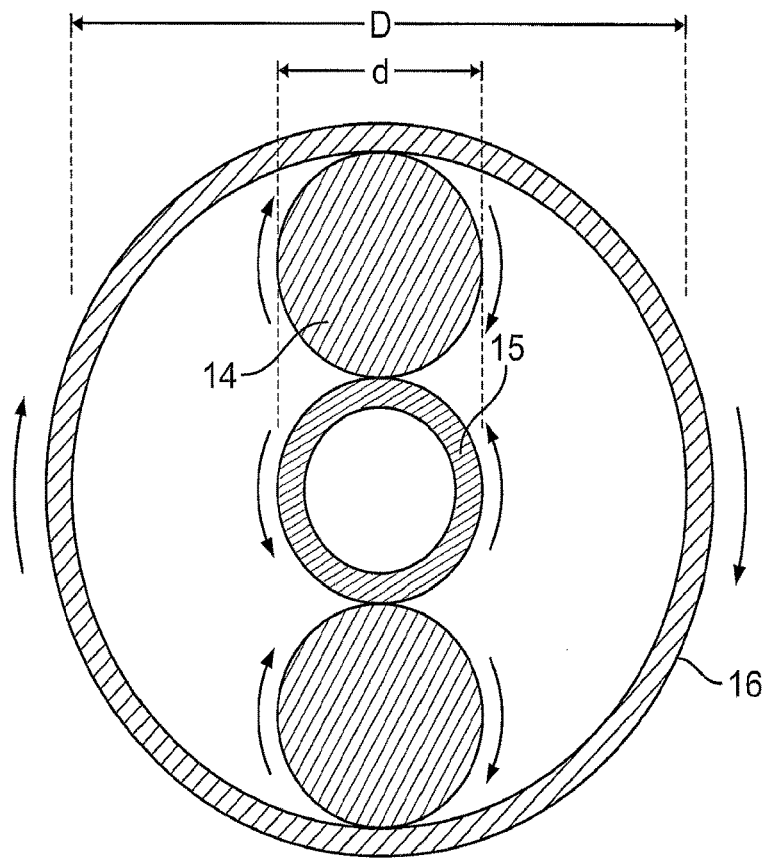
FIG. 1A shows a cross-sectional view of the inner and outer races of FIG. 1.

FIG. 1A shows a detailed view of the speed reduction/increase mechanism. In the views shown in FIGS. 1-3, the device is a speed reducer. In this device, inner race 15 is connected to input shaft 10 and outer race 16 is connected to output shaft 11. Rotation of inner race 15 by motor 20 causes bearings 14 to rotate as well, since they are held within the pocket created between inner race 15 and outer race 16 without any slippage. In turn, rotation of bearings 14 then causes outer race 16 to rotate, and consequently outer shaft 11, to which it is coupled. The degree of rotation of outer race 16 is less than the degree of rotation of inner race 15, due to the different diameters of the two races. The greater the difference between outer contact diameter d of inner race 15 and inner contact diameter D of outer race 16, the greater the degree of speed reduction or increase. The inner and outer contact diameters are based on the diameters of the inner and outer races where each contacts ball bearing 14.

Pivoting races 15 and 16 so that shafts 10, 11 are parallel to each other releases ball bearings 14 and stops the transmission of power. The system according to the invention has great advantages over conventional gear transmissions, because there is virtually no slippage between the races once the shafts are rotated to capture the balls in place. Furthermore, since there is no slipping or rubbing, wear on the balls and races is minimal.

Figure 4:
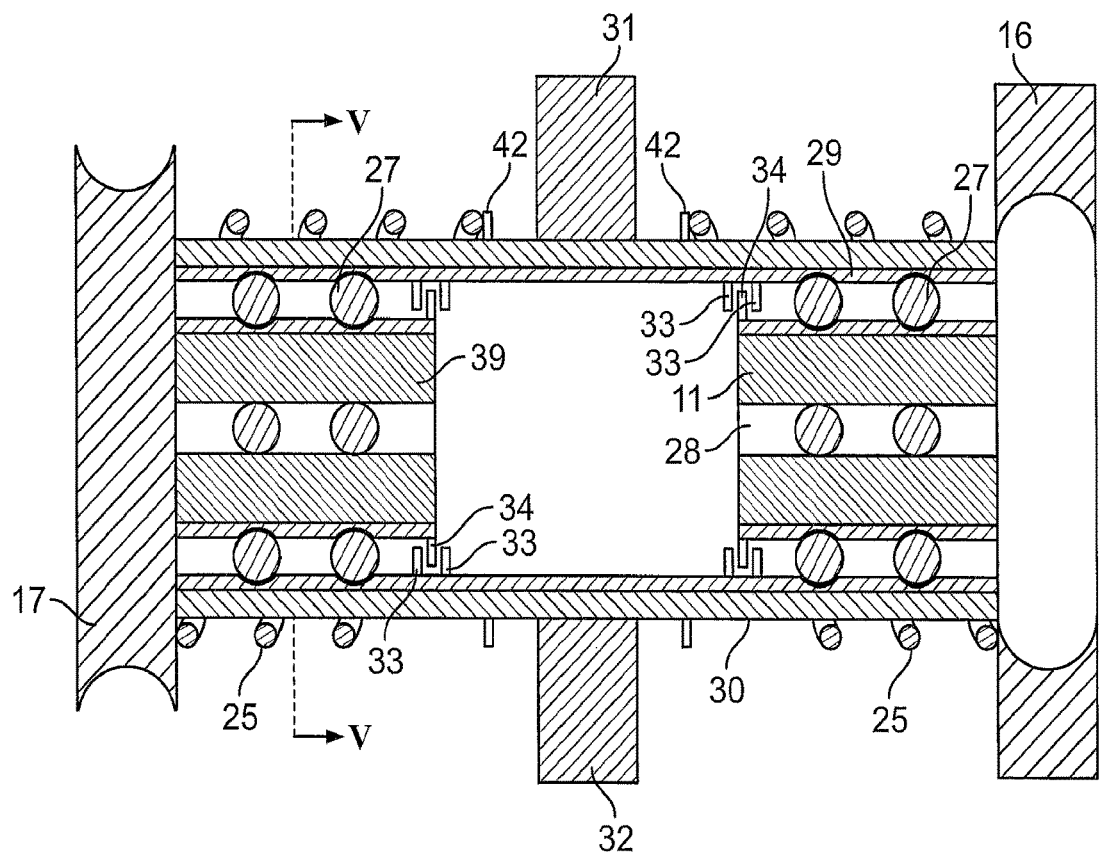
FIG. 4 shows a side cross-sectional view of the transmission system according to the invention.
Figure 5:
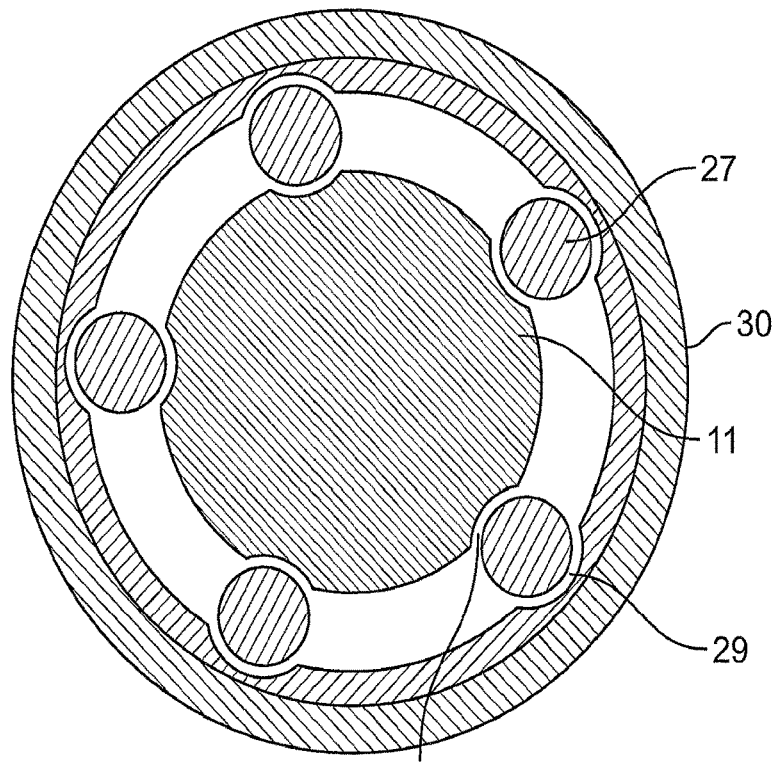
FIG. 5 shows a cross-sectional view along lines V-V of FIG. 4.
Figure 6:
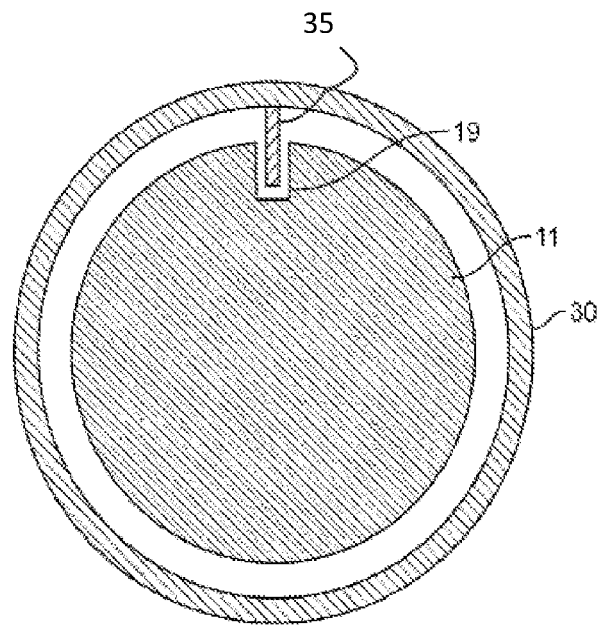
FIG. 6 shows a cross-sectional view of an alternative arrangement of the shaft and sleeve.
Figure 7:
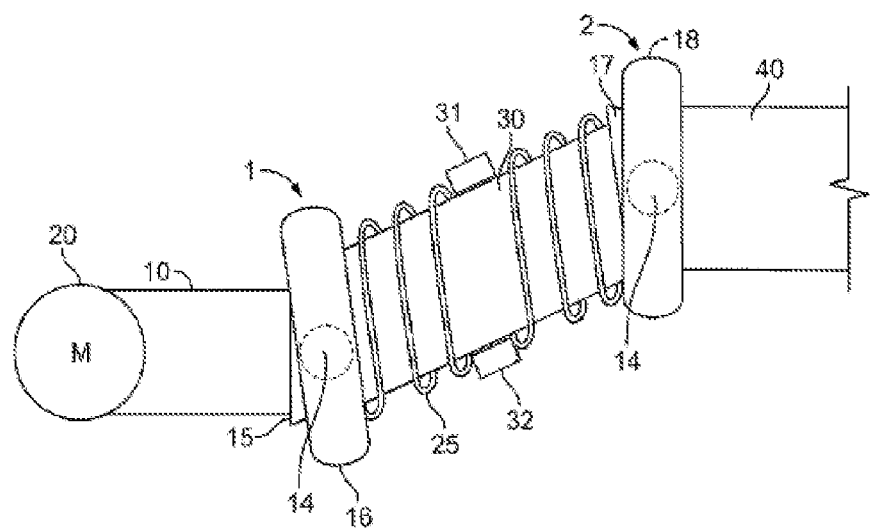
FIG. 7 shows a top view of the transmission system according to the invention shown in FIG. 4.

FIGS. 4 and 7 show an embodiment of the transmission arrangement in a transmission system having two of the above-described transmission arrangements. In the system, output shaft 11 of one transmission system, which is connected to outer race 16, is connected via a hollow sleeve 30 to a second transmission system 2, having an input shaft 39 and an inner race 17. Inner race 17 is then coupled via ball bearings to an outer race 18 and a second output shaft 40, as shown in FIG. 7. As shown in FIG. 4 and in the cross-sectional view shown in FIG. 5, shafts 11 and 39 are held within sleeve 30 so as not to rotate, by a series of ball bearings 27 that roll within cut-out channels 28 and 29 of shafts 11, 39 and sleeve 30, respectively. This arrangement allows shafts 11, 39 to slide axially within sleeve 30 (i.e., along longitudinal axis A) and yet only rotate together with sleeve 30. As an alternative, channels 28 and 29, a keyway arrangement can be provided, such as shown in FIG. 6. Here, instead of channels and balls, the shafts are held in place against rotation by a ridge 35 connected to sleeve 30, and a groove 19 cut into shaft 11 or 39. Ridge 35 slides within groove 19 and allows axial movement, but not rotation relative to sleeve 30. To prevent excessive axial motion of shafts 11, 39, a stop mechanism formed of protrusions 33, 34 is arranged between shafts 11, 39 and sleeve 30. Protrusions 33 limit the motion of shafts 11, 39 to the distance between protrusions 33, as protrusion 34 cannot pass the barrier formed on either side by protrusion 33. Other methods of limiting the axial motion could also be used.

Sleeve 30 is held in place by roller bearings 31, 32. Other means for holding sleeve 30 in place may also be used, such as a cage with ball bearings, slide bearings, or any other suitable arrangement that allows sleeve 30 to rotate when motor 20 is running.

To ensure proper pressure on transmission arrangements 1 and 2, to keep the races in proper positioning, a spring 25 may be used, as shown in FIGS. 4 and 7. Spring 25 acts on races 16 and 17, to press them against races 15 and 18, respectively to ensure proper engagement of ball bearings 14. Spring 25 rests against a stop 42 on sleeve 30. Other means of ensuring pressure of the races against each other could also be used.

As shown in FIG. 7, by using two transmission arrangements 1, 2, the shafts can be positioned so that second output shaft 40 is parallel to input shaft 10, thus avoiding any potential complications from having the shafts be set at an angle to each other. The dual transmission arrangement also allows for twice the speed reduction or increase. The system of the present invention provides for very precise rotational motion transmission, with virtually no play between the shafts. This makes the system of the present invention ideal for uses that require very accurate positioning of parts, such as in jewelry making, circuit board manufacturing, and many other industries. Furthermore, the system according to the invention is simpler to construct and does not wear down as quickly as gear-based systems, thus saving cost and maintenance time.

Figure 8:
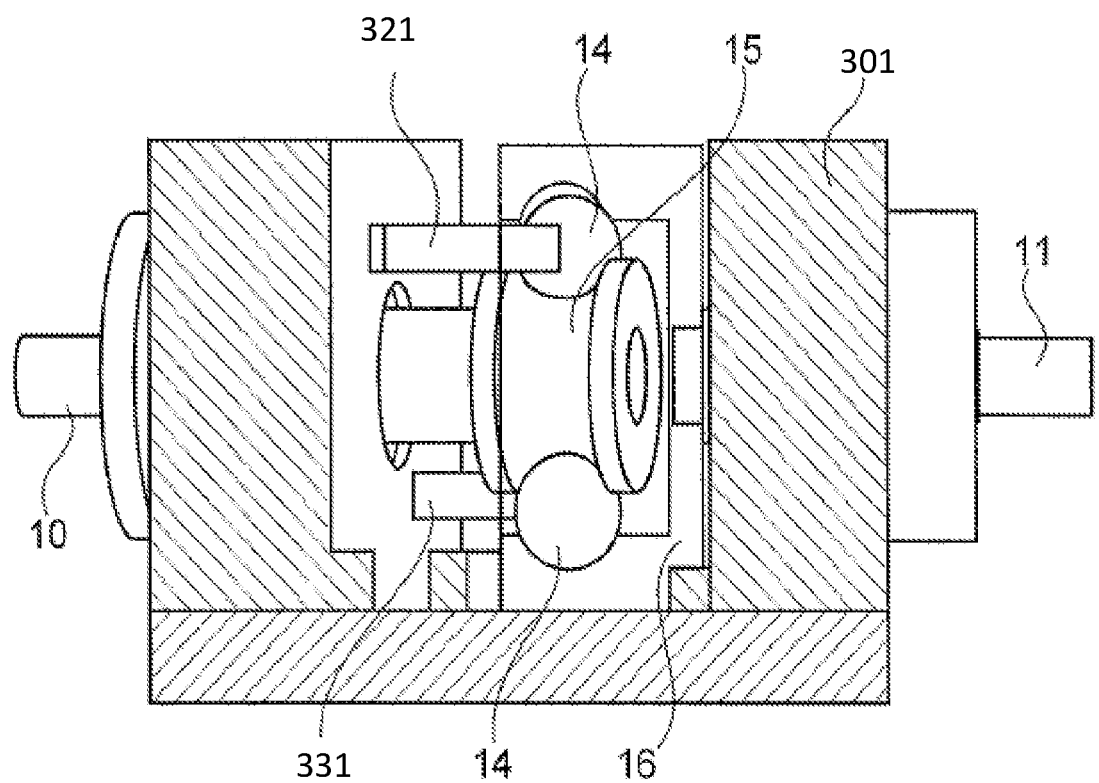
FIG. 8 shows an interior view of the arrangement having finger assists according to the present invention.
Figure 9:
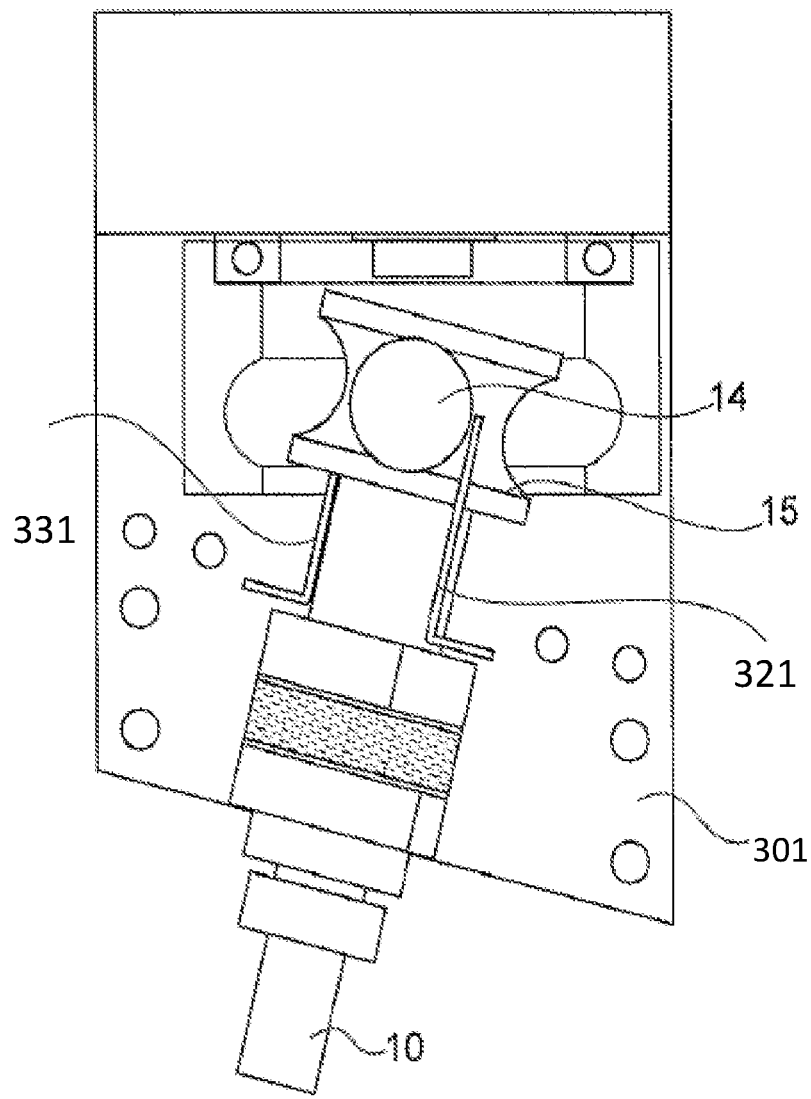
FIG. 9 shows another view of the arrangement of FIG. 8.

FIGS. 8 and 9 show another embodiment of the invention. In this embodiment, input shaft 10 and output shaft 11 are rotatably mounted in a housing 301. Two finger assists 321, 331 are fixedly mounted to housing 301 so as to press the balls 14 into their proper location between inner race 15 and outer race 16. In this embodiment, finger assists 321, 331 are made of spring steel, but other variations, such as using coil springs or any other suitable method to push the balls into location can be used as well. By using this finger assists 321, 331 the unit's manufacturing tolerances can be looser, which reduces manufacturing expenses. Also the unit will only work in one direction, and allows free spin of balls 14 in the direction opposite of that in which the balls are being pushed. This prevents the unit from being back-driven. The desired location can be defined as the natural pocket that is created by the traction drive.

FIG. 9 shows input shaft 10 in a tilted position, which engages balls 14 to transmit power to the output shaft. In this embodiment, shaft 10 is rotating in the counter-clockwise direction. Finger assist 321 will push the ball 14 to the left, and Finger assist 331 will push the other ball 14 (not shown) to the right. This assists in the engagement of the unit.

Figure 10:
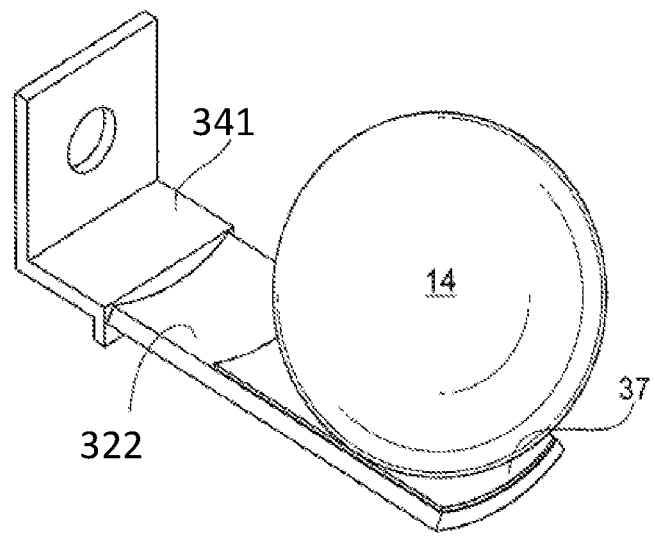
FIG. 10 shows another variation of the finger assist.
Figure 11:
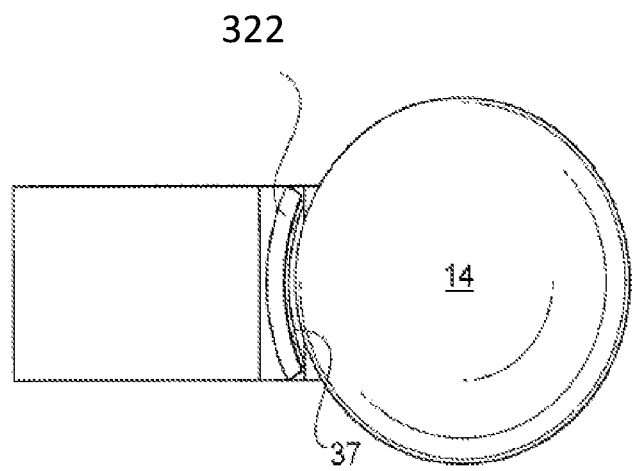
FIGS. 11 and 12 show a further embodiment, in which the finger assist is pivotable.
Figure 12:
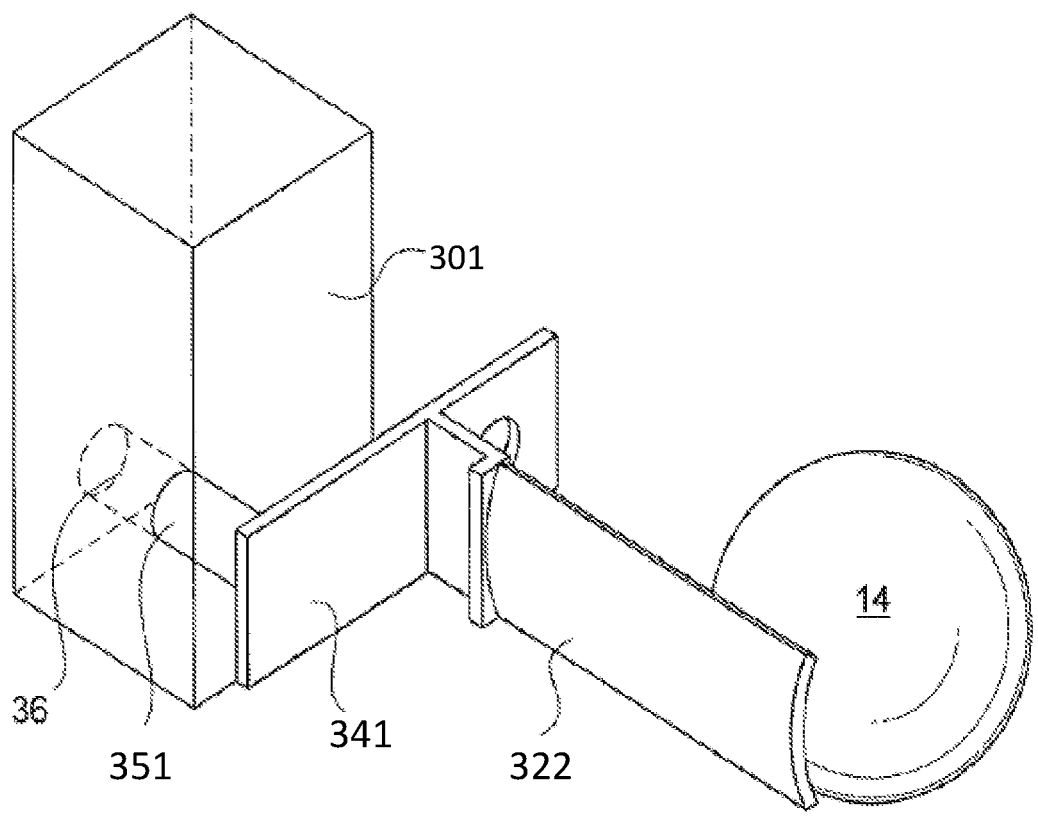

FIGS. 10-12 show another variation of the invention, in which the finger assist 322 is curved to follow the shape of the balls. This increases the stability of the device and reduces stress on the system. In addition, a coating or layer of resilient material 37, such as viton or rubber can be placed on the interior surface of finger assist 322 to increase the amount of surface area of finger assist 322 that contacts ball 14.

In FIGS. 11-12, the finger assist is shown in a pivoting mechanism formed by perpendicular base 341 mounted to shaft 351 which is pivotally positioned in bore 36 in housing 301. This allows the finger assist 322 to pivot with movement of the system, further reducing tension and wear on the system. As the ball 14 turns clockwise, the pivoting finger assist 322 will try to pivot counter clockwise. This will apply more pressure between the ball 14 and the finger assist 322. The pivoting finger assist 322 can only pivot slightly because of its radius versus the radius of the pivot point. The rate of pressure increase is determined by the speed of the fluid on the ball pushing the pivoting finger assist and also the shear strength of the lubrication.

Finger assists 321, 322, 331 can be used with any of the variations of the system shown in FIGS. 1-7 to increase the system's effectiveness, even when precise manufacturing tolerances have not been met.

Accordingly, while only a few embodiments of the present invention have been shown and described, it is obvious that many changes and modifications may be made thereunto without departing from the spirit and scope of the invention.

What is claimed is:

1. A transmission arrangement comprising:
   an input shaft, an output shaft,
   an outer race mounted on one end of one of the input and output shafts,
   an inner race mounted on one end of the other of the input and output shafts,
   the inner and outer races being arranged concentrically to create a cage for ball bearings,
   at least two ball bearings disposed within the cage diametrically opposed to each other, and
   a finger assist mounted so as to press each of the ball bearings into position within the cage,
   wherein the finger assist is made of spring steel, and
   wherein the races are pivoted with respect to each other around an axis running through each of the balls such that the balls are captured in a pocket between the races and cannot slide within the races, and so that rotation of the input shaft rotates the output shaft at a different speed than a speed of the input shaft.

2. The transmission arrangement according to claim 1, wherein the inner race is disposed on the input shaft and the outer race is disposed on the output shaft.

3. The transmission arrangement according to claim 1, wherein the outer race is disposed on the input shaft and the inner race is disposed on the output shaft.

4. The transmission arrangement according to claim 1, further comprising a motor connected to the input shaft for rotating the input shaft.

5. A system for transmitting rotational power, comprising at least two transmission arrangements according to claim 1,
   said transmission arrangements being connected to each other via an intermediate coupling,
   wherein rotation of the input shaft of the first transmission arrangement transmits rotational power through the two transmission arrangements to the output shaft of the second transmission arrangement.

6. The system according to claim 5, wherein the intermediate coupling comprises a hollow sleeve having two ends, the output shaft of a first one of the transmission arrangements being disposed in one end of the hollow sleeve and the input shaft of a second one of the transmission elements being disposed in the other end of the hollow sleeve.

7. The system according to claim 6, wherein the output shaft of the first transmission arrangement and the input shaft of the second transmission arrangement are coupled to the hollow sleeve so that the shafts can move along a longitudinal axis of the sleeve, but not rotate relative to the sleeve.

8. The system according to claim 7, wherein the output shaft of the first transmission arrangement and the input shaft of the second transmission arrangement are equipped with longitudinal grooves, and the hollow sleeve is equipped with corresponding longitudinal grooves, and further comprising ball bearings disposed in the spaces created by the longitudinal grooves of the shafts and the hollow sleeve, to allow the shafts to move axially, but not rotate within the sleeve.

9. The system according to claim 7, wherein the hollow sleeve is equipped with a longitudinal ridge, and the output shaft of the first transmission arrangement and the input shaft of the second transmission arrangement are each equipped with a longitudinal channel, wherein the ridge slides within the channels to allow axial movement of the shafts without rotational movement relative to the sleeve.

10. The system according to claim 7, further comprising a stop mechanism located on the hollow sleeve to prevent axial movement of the output shaft of the first transmission arrangement and of the input shaft of the second transmission arrangement beyond a predetermined limit.

11. The system according to claim 6, further comprising a pressure element connected to one side of each of the transmission arrangements to press the races against one another.

12. The system according to claim 11, wherein the pressure element is a spring.

13. The system according to claim 6, further comprising a bearing arrangement disposed around the hollow sleeve, to support the hollow sleeve and allow rotation of the hollow sleeve.

14. The system according to claim 13, wherein the bearing arrangement comprises at least two roller bearings.

15. The system according to claim 1, wherein the input and output shafts are rotatably mounted in a housing, and wherein the finger assists are fixedly mounted to the housing.

16. The system according to claim 15, wherein the finger assist is mounted so as to pivot in the housing.

17. The system according to claim 1, wherein a surface of the finger assist that contacts the ball bearing is curved.

18. The system according to claim 1, further comprising a layer of resilient material on a surface of the finger assist that contacts the ball bearing.

* * * * *